United States Patent
Abotabl et al.

(10) Patent No.: US 12,396,000 B2
(45) Date of Patent: Aug. 19, 2025

(54) SELECTION FROM MULTIPLE TRANSPORT BLOCKS IN UPLINK CONFIGURATION GRANT (UL-CG) BASED ON UPLINK BUFFER DATA

(71) Applicant: QUALCOMM Incorporated, San Diego, CA (US)

(72) Inventors: Ahmed Attia Abotabl, San Diego, CA (US); Muhammad Sayed Khairy Abdelghaffar, San Jose, CA (US); Marwen Zorgui, San Diego, CA (US); Yi Huang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 575 days.

(21) Appl. No.: 17/850,757

(22) Filed: Jun. 27, 2022

(65) Prior Publication Data
US 2023/0422257 A1     Dec. 28, 2023

(51) Int. Cl.
| | |
|---|---|
| H04W 72/23 | (2023.01) |
| H04L 1/00 | (2006.01) |
| H04W 72/02 | (2009.01) |
| H04W 72/1263 | (2023.01) |

(52) U.S. Cl.
CPC .......... *H04W 72/23* (2023.01); *H04L 1/0003* (2013.01); *H04W 72/02* (2013.01); *H04W 72/1263* (2013.01)

(58) Field of Classification Search
CPC . H04W 72/23; H04W 72/02; H04W 72/1263; H04L 1/0003
See application file for complete search history.

(56) References Cited

U.S. PATENT DOCUMENTS

| | | | | |
|---|---|---|---|---|
| 11,924,886 | B2* | 3/2024 | Ratasuk | H04W 52/367 |
| 2019/0075589 | A1* | 3/2019 | Jeon | H04W 72/20 |
| 2021/0076383 | A1* | 3/2021 | Wong | H04W 76/28 |
| 2023/0008530 | A1* | 1/2023 | Sharma | H04L 1/0009 |
| 2023/0164773 | A1* | 5/2023 | Alfarhan | H04W 74/0833 370/329 |
| 2023/0275683 | A1* | 8/2023 | Ersbo | H04L 1/0003 370/329 |
| 2023/0291510 | A1* | 9/2023 | Singh | H04L 1/1887 |
| 2023/0354320 | A1* | 11/2023 | Papasakellariou | H04W 72/1268 |
| 2023/0413340 | A1* | 12/2023 | Shah | H04W 74/0841 |

OTHER PUBLICATIONS

Garcia et al., "A Tutorial on 5G NR V2X Communications", IEEE Communications Surveys & Tutorials, vol. 23, No. 3, Third Quarter 2021 (Year: 2021).*

* cited by examiner

Primary Examiner — Justin T Van Roie
(74) Attorney, Agent, or Firm — Seyfarth Shaw LLP

(57) ABSTRACT

A method of wireless communication by a user equipment (UE) includes receiving a configured grant for an uplink transmission occasion including a number of transport blocks (TBs). The configured grant indicates a first modulation and coding scheme (MCS) and a first quantity of layers for a first of the TBs, and a second MCS and a second quantity of layers for a second of the TBs. The method also includes selecting the first TB and/or the second TB for an uplink transmission based on an amount of data stored in an uplink buffer. The method further includes transmitting the data in the first TB and/or the second TB that was selected.

24 Claims, 8 Drawing Sheets

SELECTION FROM MULTIPLE TRANSPORT BLOCKS IN UPLINK CONFIGURATION GRANT (UL-CG) BASED ON UPLINK BUFFER DATA

FIELD OF THE DISCLOSURE

The present disclosure relates generally to wireless communications, and more specifically to efficiently utilizing multiple transport blocks within an uplink configuration grant (UL-CG).

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and long term evolution (LTE). LTE/LTE-Advanced is a set of enhancements to the universal mobile telecommunications system (UMTS) mobile standard promulgated by the Third Generation Partnership Project (3GPP). Narrowband (NB)-Internet of things (IoT) and enhanced machine-type communications (eMTC) are a set of enhancements to LTE for machine type communications.

A wireless communications network may include a number of base stations (BSs) that can support communications for a number of user equipment (UEs). A user equipment (UE) may communicate with a base station (BS) via the downlink and uplink. The downlink (or forward link) refers to the communications link from the BS to the UE, and the uplink (or reverse link) refers to the communications link from the UE to the BS. As will be described in more detail, a BS may be referred to as a Node B, an evolved Node B (eNB), a gNB, an access point (AP), a radio head, a transmit and receive point (TRP), a new radio (NR) BS, a 5G Node B, and/or the like.

The above multiple access technologies have been adopted in various telecommunications standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation.

SUMMARY

In aspects of the present disclosure, a method for wireless communication by a user equipment (UE) includes receiving a configured grant for an uplink transmission occasion including a number of transport blocks (TBs). The configured grant indicates a first modulation and coding scheme (MCS) and a first quantity of layers for a first TB of the number of TBs, and a second MCS and a second quantity of layers for a second TB of the number of TBs. The method also includes selecting at least one of the first TB or the second TB, from the number of TBs, for an uplink transmission based on an amount of data stored in an uplink buffer. The method further includes transmitting the data in the first TB and/or second TB that was selected.

In other aspects of the present disclosure, a method of wireless communication by a network entity includes transmitting a configured grant for an uplink transmission occasion including a number of transport blocks (TBs). The configured grant indicates a first modulation and coding scheme (MCS) and a first quantity of layers for a first TB of the TBs, and a second MCS and a second quantity of layers for a second TB of the TBs. The method also includes receiving an indication of whether a user equipment (UE) is transmitting on the first TB, the second TB, or multiple TBs for the uplink transmission occasion. The method further includes receiving the first TB, the second TB, or the multiple TBs based on the indication.

Other aspects of the present disclosure are directed to an apparatus. The apparatus has a memory and one or more processors coupled to the memory. The processor(s) is configured to receive a configured grant for an uplink transmission occasion including a number of transport blocks (TBs). The configured grant indicates a first modulation and coding scheme (MCS) and a first quantity of layers for a first TB of the number of TBs, and a second MCS and a second quantity of layers for a second TB of the number of TBs. The processor(s) is also configured to select at least one of the first TB or the second TB, from the number of TBs, for an uplink transmission based on an amount of data stored in an uplink buffer. The processor(s) is further configured to transmit the data in the first TB and/or second TB that was selected.

Aspects generally include a method, apparatus, system, computer program product, non-transitory computer-readable medium, user equipment, base station, wireless communications device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that features of the present disclosure can be understood in detail, a particular description may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects. The same reference numbers in different drawings may identify the same or similar elements.

DETAILED DESCRIPTION

Figure 1:
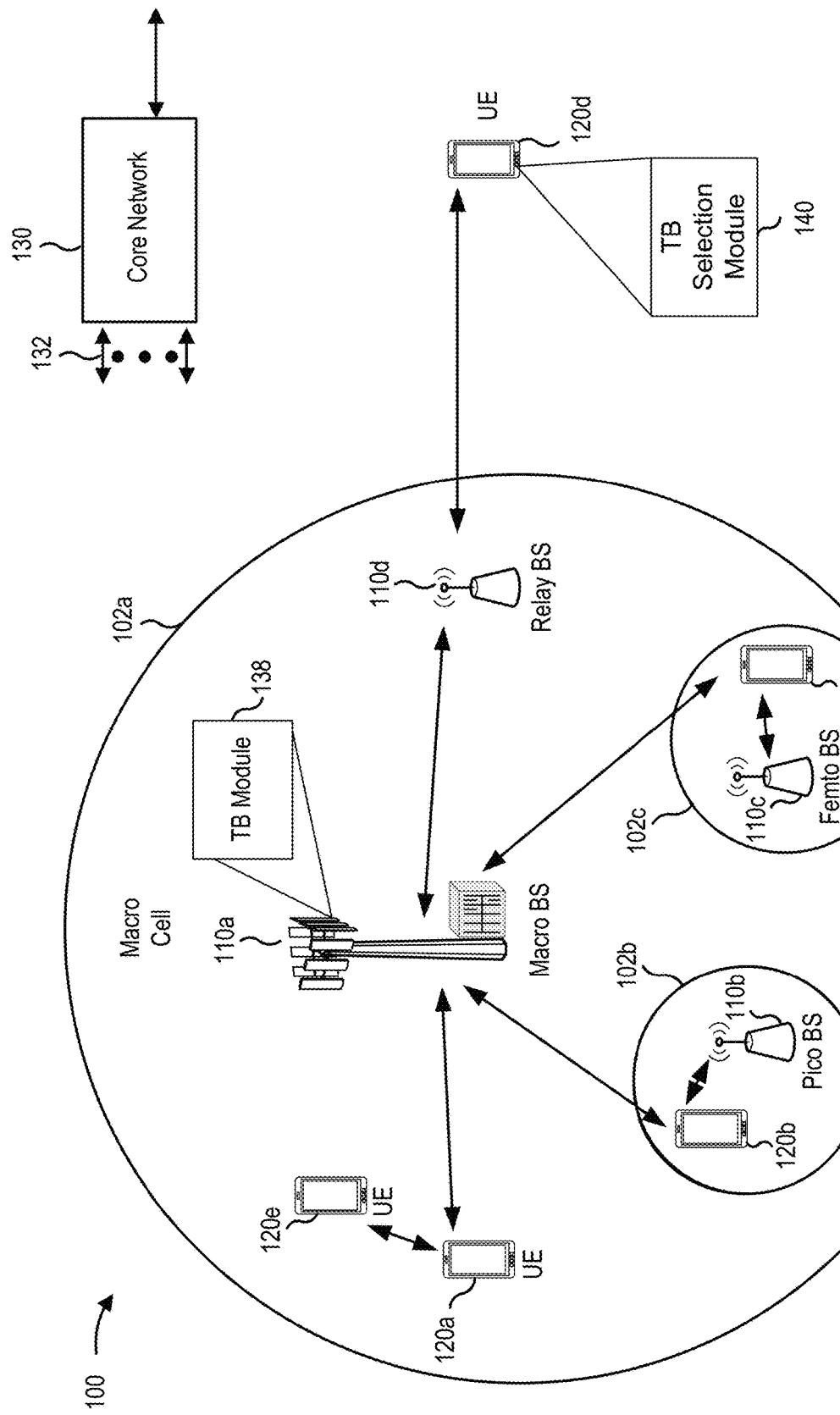
FIG. 1 is a block diagram conceptually illustrating an example of a wireless communications network, in accordance with various aspects of the present disclosure.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G and/or 4G technologies.

A user equipment (UE) may receive an uplink grant from a network entity to enable the UE to transmit uplink data. The uplink grant may be an uplink configured grant (UL-CG). An uplink configured grant assigns radio resources to a UE by defining time and frequency resources, as well as a periodicity (e.g., how often the grant repeats), and other configuration information indicating when and where the UE may transmit data. There are two types of configured grants, one type does not require downlink control information (DCI) activation and the other type requires a DCI activation. With a configured grant, the UE can transmit data from an uplink buffer as soon as the next CG transmission occasion arrives.

Uplink configured grant skipping is a feature that enables the UE to skip transmission for a configured grant in case the uplink buffer is empty or does not have enough data. Uplink grant skipping is specified when the uplink grant configures a single transport block (TB) for each transmission occasion. In some implementations, however, a configured grant may assign more than one transport block for an uplink transmission occasion. In some instances, the uplink buffer may not have enough information to transmit two transport blocks. Aspects of the present disclosure introduce methods to select which transport block to be transmitted, how to improve the coverage for the selected transport block, and how to indicate the selected transport block(s) to the network.

For example, if the uplink buffer does not have enough information to transmit two transport blocks, the UE may fall back to one transport block transmission or no transmission at all. Determining which transport block to transmit may be based on an amount of data stored in an uplink buffer.

If the UE has decided to transmit on a single transport block when multiple transport blocks are configured and if the UE has enough power available, the UE may efficiently utilize the resources for the non-transmitted transport block(s). The UE may transmit the selected transport block in addition to a repetition of the transport block and/or increased redundancy of this transport block. Thus, the UE can efficiently utilize the assigned resources regardless of the uplink buffer status.

According to aspects of the present disclosure, the UE may indicate to the network which transport block is being transmitted. In a first option, the UE implicitly indicates which of the transport blocks is being transmitted. For example, dedicated demodulation reference signal (DMRS) sequences may be employed. In a second option, the UE indicates within uplink control information (UCI) whether the UE is transmitting one or two transport blocks. In a third option, the indication is included in a payload of a last dynamic grant (DG) physical uplink shared channel (PUSCH) or configured grant (CG) PUSCH transmitted before the transmission occasion being considered.

When deciding which transport block to transmit, the UE determines if the uplink buffer has enough information to transmit both transport blocks. If so, the UE transmits both of them. If the uplink buffer has enough information to transmit a transport block with a higher modulation and coding scheme (MCS) but not both transport blocks, the UE transmits the transport block with the higher MCS. If the uplink buffer has enough information to transmit the transport block with the smaller MCS but not the higher MCS, the UE transmits the transport block with the smaller MCS. If the uplink buffer does not have enough information to transmit the transport block with the smallest MCS, the UE skips the transmission during this occasion. In some implementations, the network may configure the UE with which transport block to transmit (as opposed to selecting based on MCS) in case the buffer does not contain enough information for both transport blocks.

By selecting an appropriate transport block for transmission and using resources of a non-transmitted transport block, efficiencies can be achieved. Uplink coverage can be improved and resources are prevented from being wasted.

FIG. 1 is a diagram illustrating a network 100 in which aspects of the present disclosure may be practiced. The network 100 may be a 5G or NR network or some other wireless network, such as an LTE network. The wireless network 100 may include a number of BSs 110 (shown as BS 110a, BS 110b, BS 110c, and BS 110d) and other network entities. A BS is an entity that communicates with user equipment (UEs) and may also be referred to as a base station, an NR BS, a Node B, a gNB, a 5G Node B, an access point, a transmit and receive point (TRP), a network node, a network entity, and/or the like. A base station can be implemented as an aggregated base station, as a disaggregated base station, an integrated access and backhaul (IAB) node, a relay node, a sidelink node, etc. The base station can be implemented in an aggregated or monolithic base station architecture, or alternatively, in a disaggregated base station architecture, and may include one or more of a central unit (CU), a distributed unit (DU), a radio unit (RU), a near-real time (near-RT) RAN intelligent controller (RIC), or a non-real time (non-RT) RIC.

Each BS may provide communications coverage for a particular geographic area. In 3GPP, the term "cell" can refer to a coverage area of a BS and/or a BS subsystem serving this coverage area, depending on the context in which the term is used.

A BS may provide communications coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB," "base station," "NR BS," "gNB," "AP," "Node B," "5G NB," "TRP," and "cell" may be used interchangeably.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

The wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communications between the BS 110a and UE 120d. A relay station may also be referred to as a relay BS, a relay base station, a relay, and/or the like.

The wireless network 100 may be a heterogeneous network that includes BSs of different types (e.g., macro BSs, pico BSs, femto BSs, relay BSs, and/or the like). These different types of BSs may have different transmit power levels, different coverage areas, and different impact on interference in the wireless network 100. For example, macro BSs may have a high transmit power level (e.g., 5 to 40 watts) whereas pico BSs, femto BSs, and relay BSs may have lower transmit power levels (e.g., 0.1 to 2 watts).

As an example, the BSs 110 (shown as BS 110a, BS 110b, BS 110c, and BS 110d) and the core network 130 may exchange communications via backhaul links 132 (e.g., S1, etc.). Base stations 110 may communicate with one another over other backhaul links (e.g., X2, etc.) either directly or indirectly (e.g., through core network 130).

The core network 130 may be an evolved packet core (EPC), which may include at least one mobility management entity (MME), at least one serving gateway (S-GW), and at least one packet data network (PDN) gateway (P-GW). The MME may be the control node that processes the signaling between the UEs 120 and the EPC. All user IP packets may be transferred through the S-GW, which itself may be connected to the P-GW. The P-GW may provide IP address allocation as well as other functions. The P-GW may be connected to the network operator's IP services. The operator's IP services may include the Internet, the Intranet, an IP multimedia subsystem (IMS), and a packet-switched (PS) streaming service.

The core network 130 may provide user authentication, access authorization, tracking, IP connectivity, and other access, routing, or mobility functions. One or more of the base stations 110 or access node controllers (ANCs) may interface with the core network 130 through backhaul links 132 (e.g., S1, S2, etc.) and may perform radio configuration and scheduling for communications with the UEs 120. In some configurations, various functions of each access network entity or base station 110 may be distributed across various network devices (e.g., radio heads and access network controllers) or consolidated into a single network device (e.g., a base station 110).

UEs 120 (e.g., 120a, 120b, 120c) may be dispersed throughout the wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communications device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

One or more UEs 120 may establish a protocol data unit (PDU) session for a network slice. In some cases, the UE 120 may select a network slice based on an application or subscription service. By having different network slices serving different applications or subscriptions, the UE 120 may improve its resource utilization in the wireless network 100, while also satisfying performance specifications of individual applications of the UE 120. In some cases, the network slices used by UE 120 may be served by an AMF (not shown in FIG. 1) associated with one or both of the base station 110 or core network 130. In addition, session management of the network slices may be performed by an access and mobility management function (AMF).

The UEs 120 may include a transport block (TB) selection module 140. For brevity, only one UE 120d is shown as including the TB selection module 140. The TB selection module 140 may receive a configured grant for an uplink transmission occasion including a number of transport blocks (TBs). The configured grant indicates a first modulation and coding scheme (MCS) and a first quantity of layers for a first TB of the number of TBs, and a second MCS and a second quantity of layers for a second TB of the number of TBs. The TB selection module 140 may also select at least one of the first TB or the second TB, from the number of TBs, for an uplink transmission based on an amount of data stored in an uplink buffer. The TB selection module 140 may further transmit the data in the first TB and/or the second TB that was selected.

The core network 130 or the base stations 110 may include a TB module 138. For brevity, only one base station 110 is shown as including the TB module 138.

The TB module 138 may transmit a configured grant for an uplink transmission occasion including a number of transport blocks (TBs). The configured grant indicates a first modulation and coding scheme (MCS) and a first quantity of layers for a first TB of the TBs, and a second MCS and a second quantity of layers for a second TB of the TBs. The TB module 138 may also receive an indication of whether a user equipment (UE) is transmitting on the first TB, the second TB, or multiple TBs for the uplink transmission occasion. The TB module 138 may further receive the first TB, the second TB, or the multiple TBs based on the indication.

Some UEs may be considered machine-type communications (MTC) or evolved or enhanced machine-type communications (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communications link. Some UEs may be considered Internet-of-Things (IoT) devices, and/or may be implemented as NB-IoT (narrowband internet of things) devices. Some UEs may be considered a customer premises equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere as being performed by the base station 110. For example, the base station 110 may configure a UE 120 via downlink control information (DCI), radio resource control (RRC) signaling, a media access control-control element (MAC-CE) or via system information (e.g., a system information block (SIB).

As indicated above, FIG. 1 is provided merely as an example. Other examples may differ from what is described with regard to FIG. 1.

Figure 2:
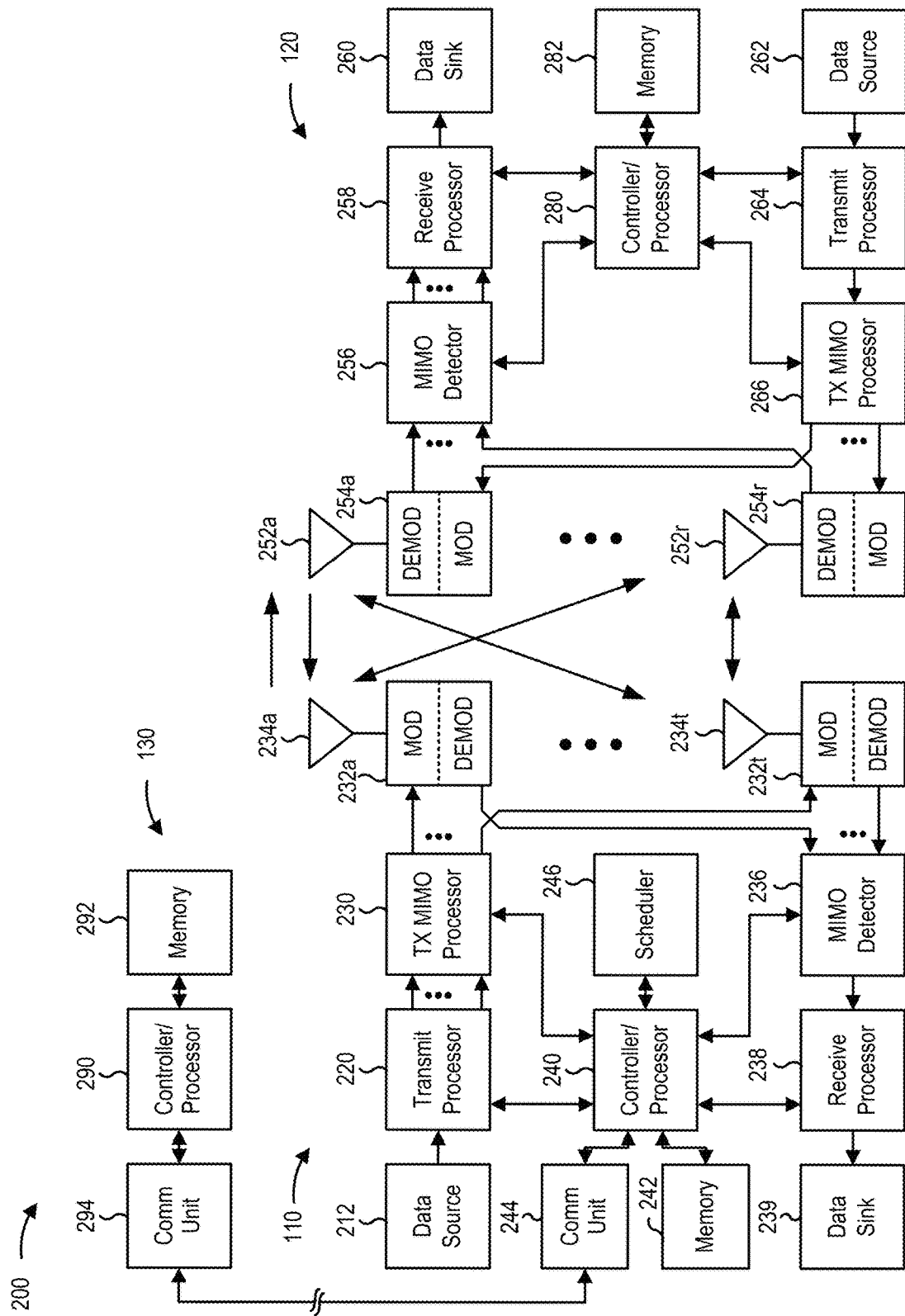
FIG. 2 is a block diagram conceptually illustrating an example of a base station in communication with a user equipment (UE) in a wireless communications network, in accordance with various aspects of the present disclosure.

FIG. 2 shows a block diagram of a design 200 of the base station 110 and UE 120, which may be one of the base stations and one of the UEs in FIG. 1. The base station 110 may be equipped with T antennas 234a through 234t, and UE 120 may be equipped with R antennas 252a through 252r, where in general T≥1 and R≥1.

At the base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Decreasing the MCS lowers throughput but increases reliability of the transmission. The transmit processor 220 may also process system information (e.g., for semi-static resource partitioning information (SRPI) and/or the like) and control information (e.g., CQI requests, grants, upper layer signaling, and/or the like) and provide overhead symbols and control symbols. The transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for orthogonal frequency division multiplexing (OFDM) and/or the like) to obtain an output sample stream. Each modulator 232 may further process (e.g., convert to analog, amplify, filter, and upconvert) the output sample stream to obtain a downlink signal.

T downlink signals from modulators 232a through 232t may be transmitted via T antennas 234a through 234t, respectively. According to various aspects described in more detail below, the synchronization signals can be generated with location encoding to convey additional information.

At the UE 120, antennas 252a through 252r may receive the downlink signals from the base station 110 and/or other base stations and may provide received signals to demodulators (DEMODs) 254a through 254r, respectively. Each demodulator 254 may condition (e.g., filter, amplify, down-convert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for the UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of the UE 120 may be included in a housing.

On the uplink, at the UE 120, a transmit processor 264 may receive and process data from a data source 262 and control information (e.g., for reports comprising RSRP, RSSI, RSRQ, CQI, and/or the like) from the controller/processor 280. Transmit processor 264 may also generate reference symbols for one or more reference signals. The symbols from the transmit processor 264 may be precoded by a TX MIMO processor 266 if applicable, further processed by modulators 254a through 254r (e.g., for DFT-s-OFDM, CP-OFDM, and/or the like), and transmitted to the base station 110. At the base station 110, the uplink signals from the UE 120 and other UEs may be received by the antennas 234, processed by the demodulators 254, detected by a MIMO detector 236 if applicable, and further processed by a receive processor 238 to obtain decoded data and control information sent by the UE 120. The receive processor 238 may provide the decoded data to a data sink 239 and the decoded control information to a controller/processor 240. The base station 110 may include communications unit 244 and communicate to the core network 130 via the communications unit 244. The core network 130 may include a communications unit 294, a controller/processor 290, and a memory 292.

The controller/processor 240 of the base station 110, the controller/processor 280 of the UE 120, and/or any other component(s) of FIG. 2 may perform one or more techniques associated with TB selection, as described in more detail elsewhere. For example, the controller/processor 240 of the base station 110, the controller/processor 280 of the UE 120, and/or any other component(s) of FIG. 2 may perform or direct operations of, for example, the processes of FIGS. 9 and 10 and/or other processes as described. Memories 242 and 282 may store data and program codes for the base station 110 and UE 120, respectively. A scheduler 246 may schedule UEs for data transmission on the downlink and/or uplink.

In some aspects, the UE 120 and/or base station 110 may include means for receiving, means for selecting, means for transmitting, means for skipping, means for repeating, means for remapping, and means for indicating. Such means may include one or more components of the UE 120 or base station 110 described in connection with FIG. 2.

As indicated above, FIG. 2 is provided merely as an example. Other examples may differ from what is described with regard to FIG. 2.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), an evolved NB (eNB), an NR BS, 5G NB, an access point (AP), a transmit and receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU, and RU also can be implemented as virtual units (e.g., a virtual central unit (VCU), a virtual distributed unit (VDU), or a virtual radio unit (VRU)).

Base station-type operations or network designs may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 3:
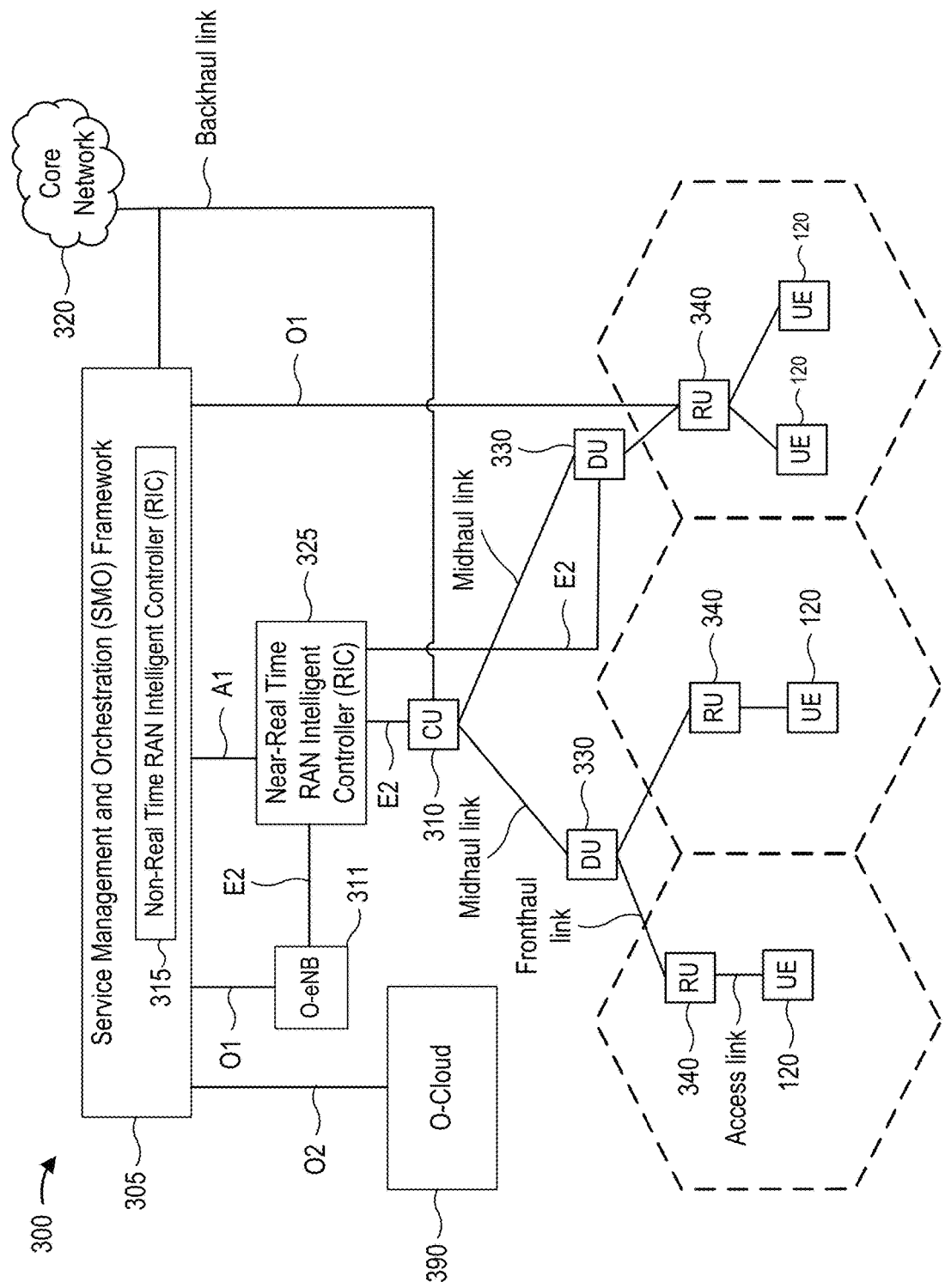
FIG. 3 is a block diagram illustrating an example disaggregated base station architecture, in accordance with various aspects of the present disclosure.

FIG. 3 shows a diagram illustrating an example disaggregated base station 300 architecture. The disaggregated base station 300 architecture may include one or more central units (CUs) 310 that can communicate directly with a core network 320 via a backhaul link, or indirectly with the core network 320 through one or more disaggregated base station units (such as a near-real time (near-RT) RAN intelligent controller (RIC) 325 via an E2 link, or a non-real time (non-RT) RIC 315 associated with a service management and orchestration (SMO) framework 305, or both). A CU 310 may communicate with one or more distributed units (DUs) 330 via respective midhaul links, such as an F1 interface. The DUs 330 may communicate with one or more radio units (RUs) 340 via respective fronthaul links. The RUs 340 may communicate with respective UEs 120 via one or more radio frequency (RF) access links. In some implementations, the UE 120 may be simultaneously served by multiple RUs 340.

Each of the units (e.g., the CUs 310, the DUs 330, the RUs 340, as well as the near-RT RICs 325, the non-RT RICs 315, and the SMO framework 305) may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (e.g., central unit—user plane (CU-UP)), control plane functionality (e.g., central unit—control Plane (CU-CP)), or a combination thereof. In some implementations, the CU 310 can be logically split into one or more CU-UP units and one or more CU-CP units. The CU-UP unit can communicate bi-directionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the Third Generation Partnership Project (3GPP). In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 120. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340, and near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a non-RT RIC 315 configured to support functionality of the SMO Framework 305.

The non-RT RIC 315 may be configured to include a logical function that enables non-real-time control and optimization of RAN elements and resources, artificial intelligence/machine learning (AI/ML) workflows including model training and updates, or policy-based guidance of applications/features in the near-RT RIC 325. The non-RT RIC 315 may be coupled to or communicate with (such as via an A1 interface) the near-RT RIC 325. The near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as the O-eNB 311, with the near-RT RIC 325.

In some implementations, to generate AI/ML models to be deployed in the near-RT RIC 325, the non-RT RIC 315 may receive parameters or external enrichment information from external servers. Such information may be utilized by the near-RT RIC 325 and may be received at the SMO Framework 305 or the non-RT RIC 315 from non-network data sources or from network functions. In some examples, the non-RT RIC 315 or the near-RT RIC 325 may be configured to tune RAN behavior or performance. For example, the non-RT RIC 315 may monitor long-term trends and patterns for performance and employ AI/ML models to perform corrective actions through the SMO Framework 305 (such as reconfiguration via O1) or via creation of RAN management policies (such as A1 policies).

A UE may receive an uplink grant from a network entity to enable the UE to transmit uplink data. The uplink grant may be an uplink configured grant (CG). An uplink configured grant (CG) assigns radio resources to a UE by defining time and frequency resources, as well as a periodicity (e.g., how often the grant repeats), and other configurations indicating when and where the UE may transmit data. There are two types of configured grants, one type does not require downlink control information (DCI) activation and the other type requires a DCI activation. With a configured grant, the UE can transmit data from an uplink buffer as soon as the next CG transmission occasion arrives.

Uplink configured grant skipping is a feature that enables the UE to skip transmission for a configured grant in case the uplink buffer is empty or does not have enough data. Uplink grant skipping is specified for when the uplink grant configures a single transport block (TB) for each transmission occasion. In some implementations, however, a configured grant may assign more than one transport block for an uplink transmission occasion. In some instances, the uplink buffer may not have enough information to transmit two transport blocks. Aspects of the present disclosure introduce methods to select which transport block to be transmitted, how to improve the coverage for the selected transport block, and how to indicate the selected transport block(s) to the network.

For example, if the uplink buffer does not have enough information to transmit two transport blocks, the UE may fall back to one transport block transmission or no transmission at all. If the UE has decided to transmit on a single transport block when multiple transport blocks are configured and if the UE has enough power available, the UE may efficiently utilize the resources for the non-transmitted transport block(s). The UE may transmit the selected transport block in addition to a repetition of the transport block and/or increased redundancy of this transport block. Thus, the UE can efficiently utilize the assigned resources regardless of the uplink buffer status.

Determining which transport block to transmit may be based on an amount of data stored in an uplink buffer. For example, assume that two transport blocks are configured for a given uplink configured grant. In this example, the transport blocks have a first and second modulation coding scheme (MCS), MCS 1 and MCS 2, respectively. The transport blocks are also configured with a number of layers, N1 and N2, respectively. If the uplink buffer has enough information to transmit both transport blocks, the UE transmits both of them. If the uplink buffer has enough information to transmit the transport block with a higher MCS but not both transport blocks, the UE transmits the transport block with the higher MCS. This is because the higher MCS transport block consumes fewer resources. If the uplink buffer has enough information to transmit the transport block with the smaller MCS but not the higher MCS, the UE transmits the transport block with the smaller MCS. If the uplink buffer does not have enough information to transmit the transport block with the smallest MCS, the UE skips the transmission during this occasion.

In some implementations, the MCS may be the same for both transport blocks. In these implementations, the network may configure the UE to perform a transmission on a particular transport block in case the buffer does not contain enough information for both transport blocks. That is, the network may transmit a configuration indicating which transport block to use. For example, the network may configure the UE to transmit the first transport block with a radio resource control (RRC) configuration.

If the UE decides to drop one of the transport blocks, aspects of the present disclosure provide solutions to achieve higher uplink coverage. In some of these aspects, the UE may be configured with two transport blocks, each having a same number of multiple input, multiple output (MIMO) layers. In one example, the UE decides to transmit only one transport block out of the two. The UE may use the layers of the non-transmitted transport block to repeat the transmitted transport block for higher uplink coverage of the transmitted transport block.

Figure 4:
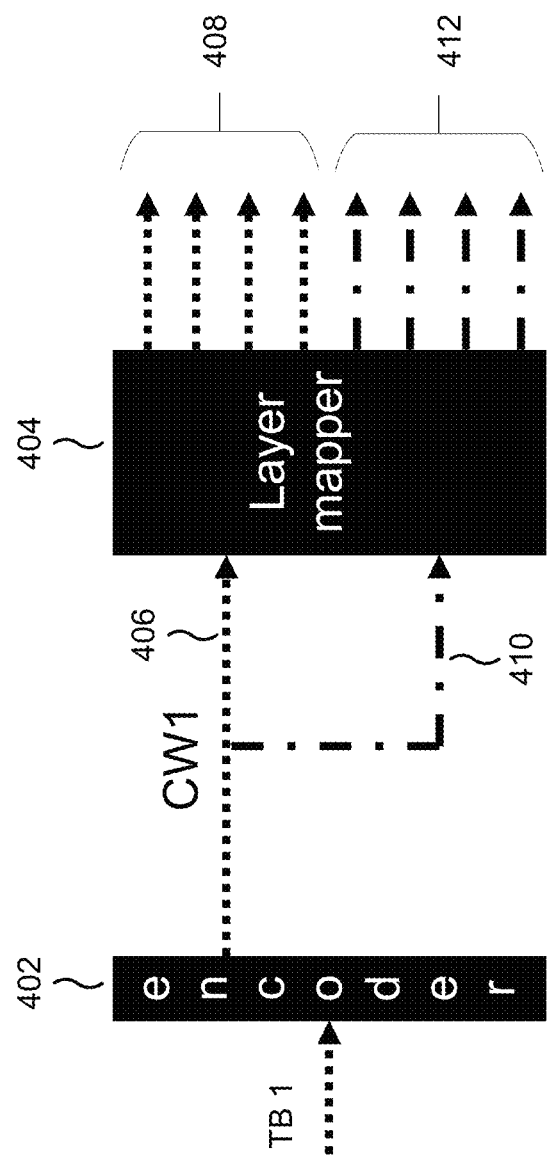
FIG. 4 is a block diagram illustrating repetition across layers of an unused transport block (TB) of an uplink configured grant (UL-CG), in accordance with aspects of the present disclosure.

FIG. 4 is a block diagram illustrating repetition across layers of an unused transport block (TB) of an uplink configured grant (CG), in accordance with aspects of the present disclosure. In the example of FIG. 4, an encoder 402 receives a transport block TB 1 and encodes the transport block TB 1 into a codeword CW 1. In this example, the UE is configured with two transport blocks, TB1 and TB 2, each having four layers. The UE has decided to transmit the first transport block TB 1, but not the second transport block TB 2.

A layer mapper 404 receives the codeword CW 1 via a primary path 406. The layer mapper 404 maps the codeword CW 1 to a first set of streams 408 associated with the transmitted transport block TB 1. The layer mapper 404 also receives a repetition of the codeword CW 1 via a secondary path 410. The layer mapper 404 maps the codeword CW 1 to a second set of streams 412 associated with the non-transmitted transport block TB 2. As a result of the repetition of the first transport block TB 1, uplink coverage is improved.

In further aspects of the present disclosure, the UE is configured with two transport blocks, each having a different number of layers. According to these aspects, the UE may utilize the layers of the non-transmitted transport block to improve uplink coverage. For example, if the transmitted transport block has a smaller number of layers than the other transport block, the UE may repeat the transmitted transport block on the layers of the other transport block. In some implementations, the UE may select certain layers of the non-transmitted transport block for repetition while skipping the rest of the layers. In other implementations, the UE may transmit extra parity bits in one or some of the remaining layers.

Figure 5:
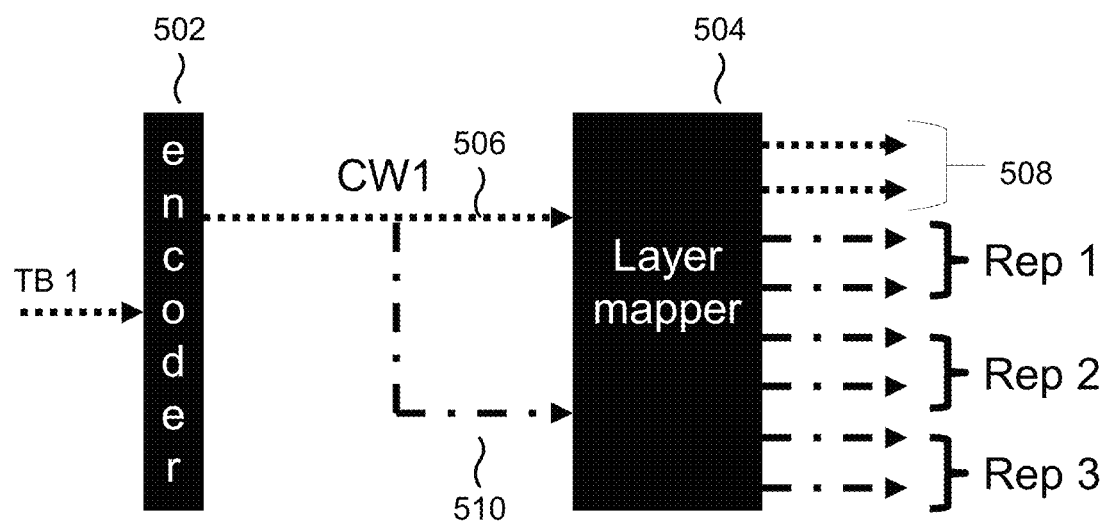
FIG. 5 is a block diagram illustrating an alternate configuration for repetition across layers of an unused transport block of an uplink configured grant, in accordance with aspects of the present disclosure.

FIG. 5 is a block diagram illustrating an alternate configuration for repetition across layers of an unused transport block (TB) of an uplink configured grant (CG), in accordance with aspects of the present disclosure. In the example of FIG. 5, an encoder 502 receives a transport block TB 1 and encodes the transport block TB 1 into a codeword CW 1. In this example, the UE is configured with two transport blocks, TB1 and TB 2. The first transport block TB1 has two layers. The second transport block TB2 has six layers. In the example of FIG. 5, the UE has decided to transmit the first transport block TB 1, but not the second transport block TB 2.

A layer mapper 504 receives the codeword CW 1 via a primary path 506. The layer mapper 504 maps the codeword CW 1 to a first set of streams 508 associated with the transmitted transport block TB 1. The layer mapper 504 also receives a repetition of the codeword CW 1 via a secondary path 510. The layer mapper 504 maps the codeword CW 1 to a second set of streams associated with the non-transmitted transport block TB 2 as a first repetition Rep 1. The layer mapper 504 maps the codeword CW 1 to a third set of streams associated with the non-transmitted transport block TB 2 as a second repetition Rep 2. In some implementations (not shown), the last two layers may be skipped if the UE is configured to repeat twice instead of three times. As a result of the multiple repetitions of the first transport block TB 1, uplink coverage is improved.

To further improve uplink coverage, the UE may transmit extra parity bits in one of the remaining layers. The parity bits may transmitted instead of the third repetition, in place of the second repetition, in place of the first repetition, or in place of all the repetitions. The parity bits are extra bits that are a function of the codeword bits and may help the decoding process in a different way from how repetition helps.

In other aspects of the present disclosure, the UE is configured with two transport blocks, each having a different number of layers, with the transmitted transport block having more layers than the non-transmitted transport block. According to these aspects, the UE may utilize the layers of the non-transmitted transport block to improve uplink coverage. For example, when the transmitted transport block has a larger number of layers than the other transport block, the UE may transmit extra parity bits of the transmitted transport block over the layers of the non-transmitted transport block. In other implementations, a new layer mapper may be defined to map the codeword across all layers, not just the layers configured for the transmitted transport block. In still other implementations, the UE may repeat selected layers. For example, the first and second layers may be repeated if the non-transmitted transport block has two layers.

Figure 6:
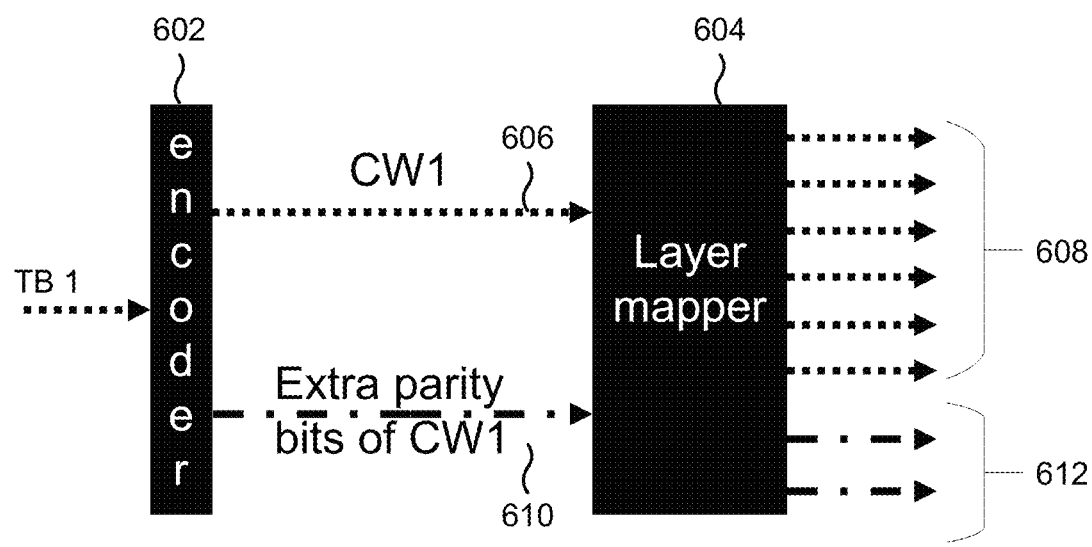
FIG. 6 is a block diagram illustrating use of layers of a non-transmitted transport block of an uplink configured grant, in accordance with aspects of the present disclosure.

FIG. 6 is a block diagram illustrating use of layers of a non-transmitted transport block (TB) of an uplink configured grant (CG), in accordance with aspects of the present disclosure. In the example of FIG. 6, an encoder 602 receives a transport block TB 1 and encodes the transport block TB 1 into a codeword CW 1. In this example, the UE is configured with two transport blocks, TB1 and TB 2. The first transport block TB1 has six layers. The second transport block TB2 has two layers. In the example of FIG. 6, the UE has decided to transmit the first transport block TB 1, and not the second transport block TB 2.

A layer mapper 604 receives the codeword CW 1 via a primary path 606. The layer mapper 604 maps the codeword CW 1 to a first set of streams 608 associated with the transmitted transport block TB 1. The layer mapper 604 also receives extra parity bits of the codeword CW 1 via a secondary path 610. The layer mapper 604 maps the extra parity bits to a second set of streams 612 associated with the non-transmitted transport block TB 2. As a result of using the layers configured for the non-transmitted transport block TB 2, uplink coverage is improved.

Although not specifically shown in FIG. 6, in other implementations, a new layer mapper may be defined to map the codeword across all layers, not just the layers configured for the transmitted transport block. For example, the layer mapper 604 may map the codeword CW 1 to non-consecutive layers (not shown). In still other implementations, the UE may repeat certain layers of the code word CW 1 (not shown). For example, the first and second layers may be repeated on the second set of streams 612 (not shown).

According to aspects of the present disclosure, the UE may indicate to the network which transport block is being transmitted. In a first option, the UE implicitly indicates which of the transport blocks is being transmitted. For example, dedicated demodulation reference signal (DMRS) sequences may be employed. In this example, DMRS sequence set 1 is used for two transport block transmissions, and DMRS sequence set 2 is used for one transport block transmission. In a second option, the UE indicates within uplink control information (UCI) whether the UE is transmitting one or two transport blocks.

Figure 7:
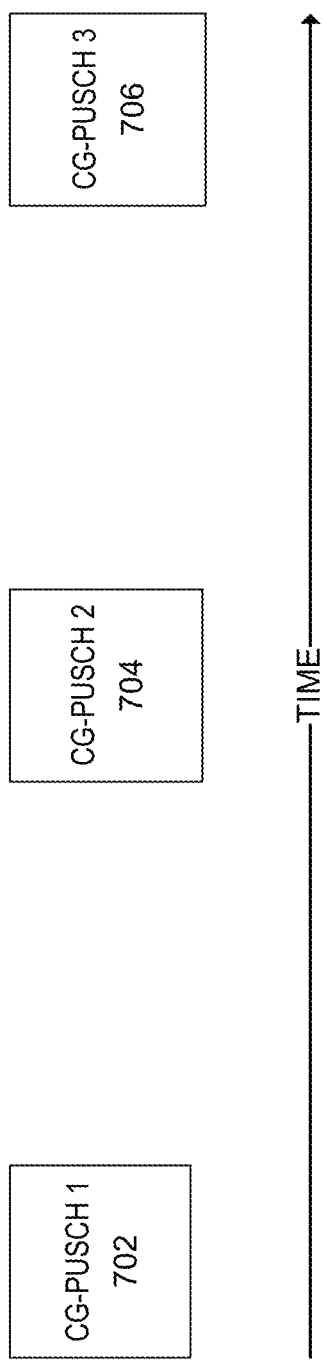
FIGS. 7 and 8 are block diagrams illustrating indications of which transport blocks of an uplink configured grant will be transmitted, in accordance with aspects of the present disclosure.

In a third option, the indication is included in the payload of the last dynamic grant (DG) physical uplink shared channel (PUSCH) or configured grant (CG)-PUSCH transmitted before the transmission occasion being considered. FIG. 7 is a block diagram illustrating an indication of which transport blocks of an uplink configured grant will be transmitted, in accordance with aspects of the present disclosure. In the example of FIG. 7, a first CG-PUSCH 702, a second CG-PUSCH 704, and a third CG-PUSCH 706 are shown. In this example, the UE indicates whether one or two transport blocks will be transmitted for the third CG-PUSCH 706. The second CG-PUSCH 704 is the most recent PUSCH transmitted before the uplink transmission occasion for the third CG-PUSCH 706. Thus, the UE provides the indication in the payload of the second CG-PUSCH 704.

Figure 8:
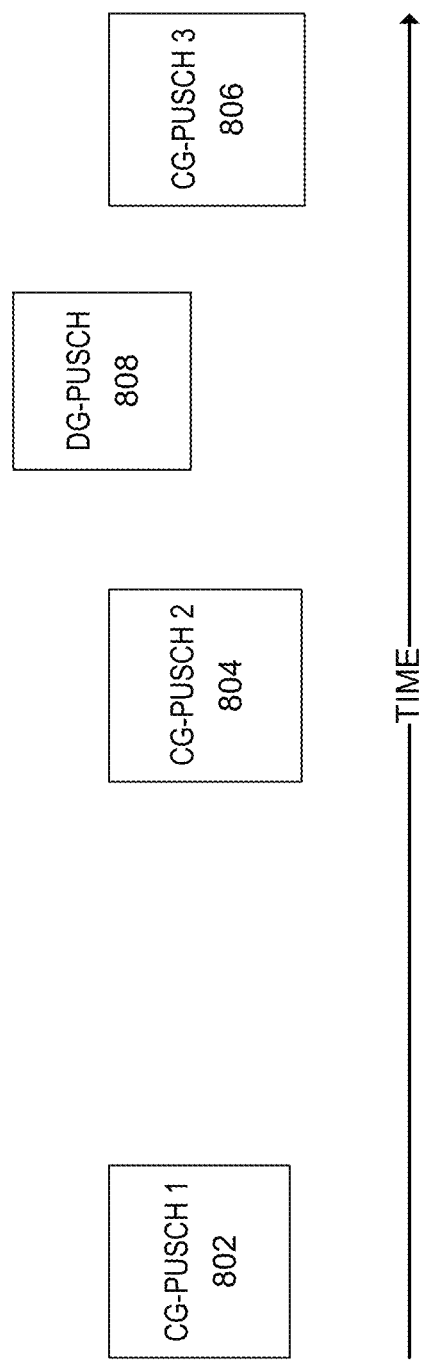

FIG. 8 is a block diagram illustrating an indication of which transport blocks of an uplink configured grant will be transmitted, in accordance with aspects of the present disclosure. In the example of FIG. 8, a first CG-PUSCH 802, a second CG-PUSCH 804, a third CG-PUSCH 806, and a DG-PUSCH 808 are shown. In this example, the UE indicates whether one or two transport blocks will be transmitted for the third CG-PUSCH 806. The DG-PUSCH 808 is the most recent PUSCH transmitted before the uplink transmission occasion for the third CG-PUSCH 806. Thus, the UE provides the indication in the payload of the DG-PUSCH 808. By informing the network as close as possible to when the decision of which transport blocks to transmit, the UE can more accurately make the decision based on the data in the uplink buffer at a time closest to when the transmission will occur.

As indicated above, FIGS. 4-8 are provided as examples. Other examples may differ from what is described with respect to FIGS. 4-8.

Figure 9:
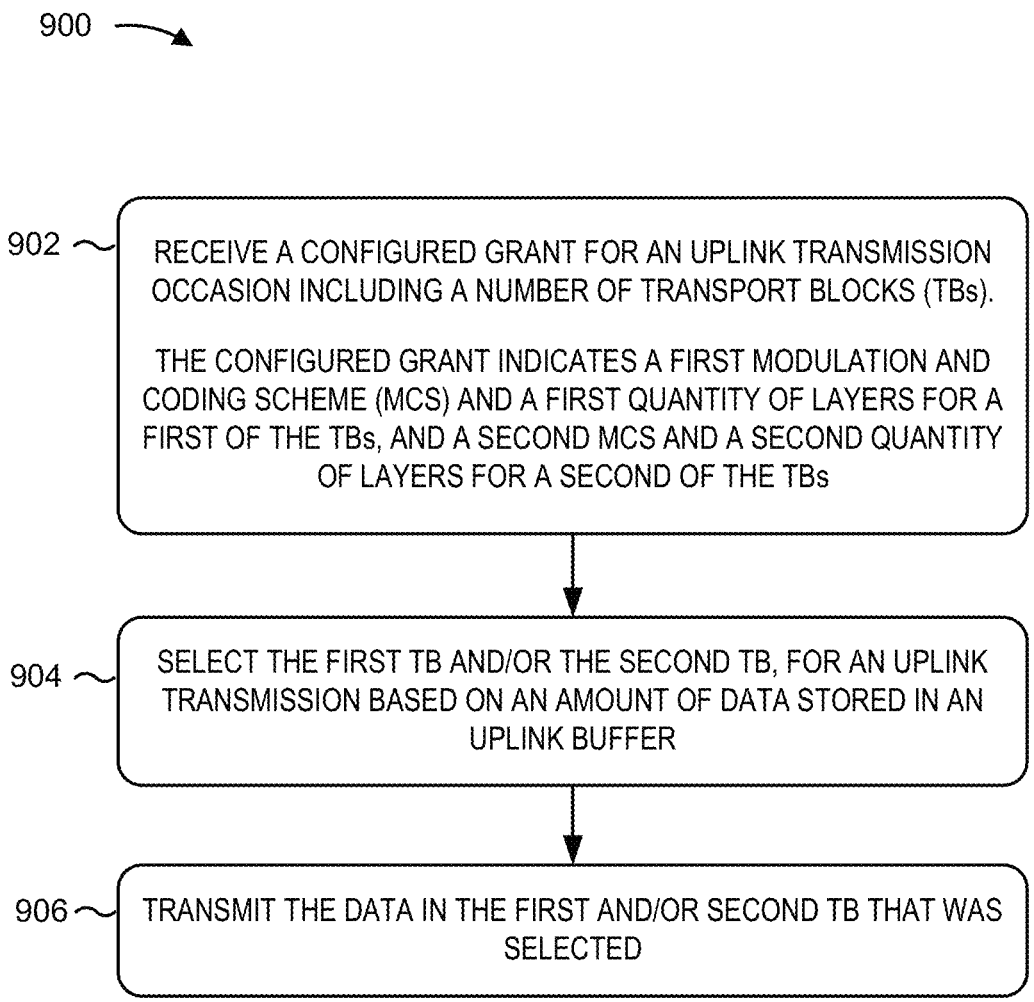
FIG. 9 is a flow diagram illustrating an example process performed, for example, by a user equipment (UE), in accordance with various aspects of the present disclosure.

FIG. 9 is a flow diagram illustrating an example process 900 performed, for example, by a user equipment (UE), in accordance with various aspects of the present disclosure. The example process 900 is an example of efficiently utilizing multiple transport blocks within an uplink configuration grant (UL-CG). The operations of the process 900 may be implemented by a UE 120.

At block 902, the UE receives a configured grant for an uplink transmission occasion including a number of transport blocks (TBs). The configured grant indicates a first modulation and coding scheme (MCS) and a first quantity of layers for a first TB of the number of TBs, and a second MCS and a second quantity of layers for a second TB of the number of TBs. For example, the UE (e.g., using the antenna 252, DEMOD/MOD 254, MIMO detector 256, receive processor 258, controller/processor 280, memory 282, and/or the like) may receive the configured grant. In some aspects, the UE may receive a configuration indicating a TB to select when the uplink buffer does not contain enough data to transmit on the TBs.

At block 904, the UE selects at least one of the first TB or the second TB, from the number of TBs, for an uplink transmission based on an amount of data stored in an uplink buffer. For example, the UE (e.g., using the controller processor 28, memory 282, and/or the like) may select the first TB and/or the second TB, from the number of TBs. In some aspects, the UE selects the first TB associated with the first MCS when the uplink buffer contains enough data to transmit on the first TB associated with the first MCS, but not enough data to transmit on multiple TBs. In this case, the first MCS is higher than the second MCS. The UE may select the second TB associated with the second MCS when the uplink buffer contains enough data to transmit on the second TB associated with the second MCS but too much data to transmit on the first TB with the first MCS. The UE may skip transmission during the transmission occasion when the uplink buffer does not contain enough data to transmit on the second TB with the second MCS. The UE may indicate to a network whether the UE is transmitting on the first TB or multiple TBs. The indicating may be implicit based on a dedicated demodulation reference signal (DMRS) sequence, via uplink control information (UCI), or via a payload of a most recent physical uplink shared channel (PUSCH) transmitted before the uplink transmission occasion.

At block 906, the UE transmits the data in the at least one the first TB or the second TB that was selected. For example, the UE (e.g., using the antenna 252, DEMOD/MOD 254, TX MIMO processor 266, transmit processor 264, controller/processor 280, memory 282, and/or the like) may transmit the data. In some aspects, the UE repeats transmission on layers of the second of the TBs in response to selecting the first of the TBs for uplink transmission when the first TB and the second TB have a same quantity of layers. In other aspects, the UE repeats transmission of the data multiple times on layers of the second of the TBs in response to selecting the first of the TBs for uplink transmission when the first TB has a smaller quantity of layers than the second TB. In still other aspects, the UE transmits information related to the data transmitted on the first of the TBs selected for the uplink transmission. The information is transmitted on layers of the second of the TBs when the first TB has a larger quantity of layers than the second TB. The information related to the data may comprises additional parity bits for the data. The information related to the data may comprise selected layers for the data. The UE may remap layers for transmitting data on the first TB to include layers of the second of the TBs in response to the first TB having a larger quantity of layers than the second TB.

Figure 10:
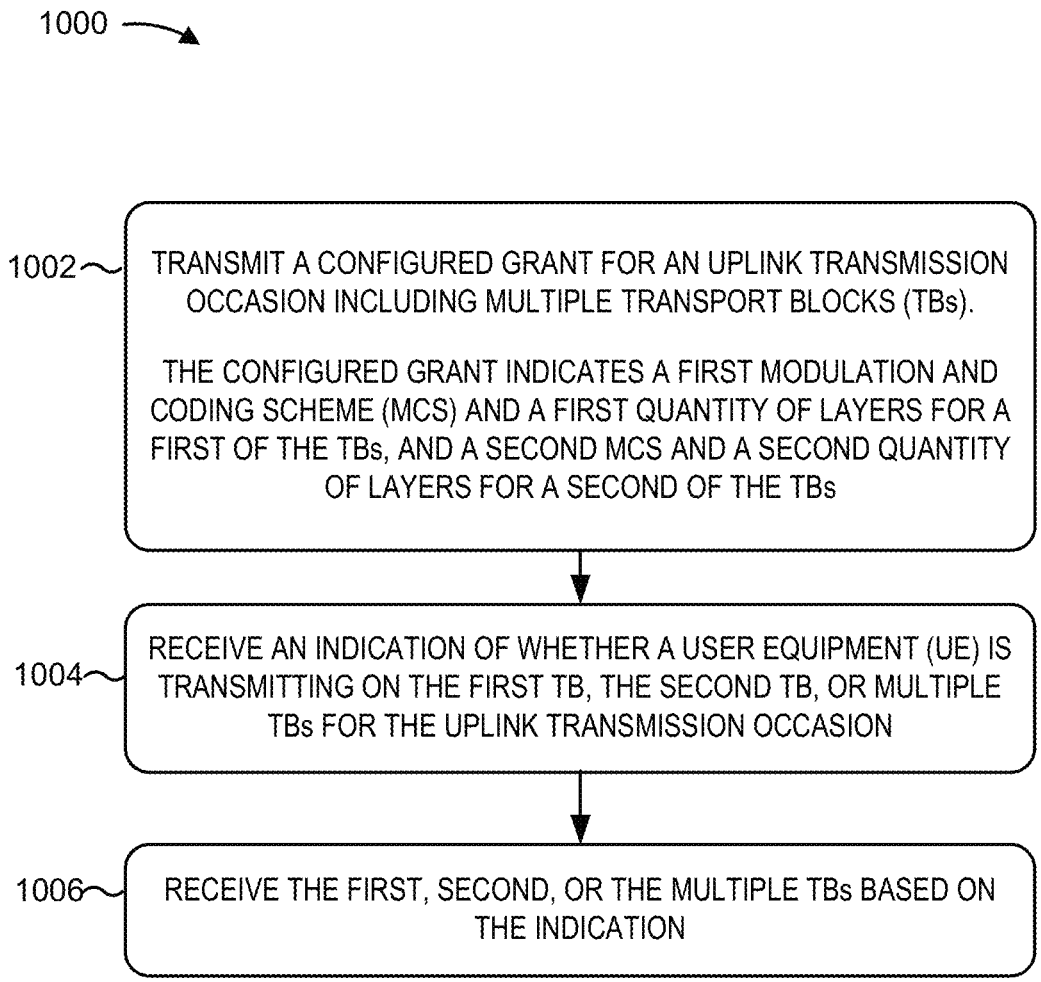
FIG. 10 is a flow diagram illustrating an example process performed, for example, by a network entity, in accordance with various aspects of the present disclosure.

FIG. 10 is a flow diagram illustrating an example process 1000 performed, for example, by a network entity, in accordance with various aspects of the present disclosure. The example process 1000 is an example of efficiently utilizing multiple transport blocks within an uplink configuration grant (UL-CG). The operations of the process 1000 may be implemented by a base station 110 or a component of a base station.

At block 1002, the base station transmits a configured grant for an uplink transmission occasion including a number of transport blocks (TBs). The configured grant indicates a first modulation and coding scheme (MCS) and a first quantity of layers for a first TB of the TBs, and a second MCS and a second quantity of layers for a second TB of the TBs. For example, the base station (e.g., using the antenna 234, MOD/DEMOD 232, TX MIMO processor 230, transmit processor 220, controller/processor 240, memory 242, and/or the like) may transmit the configured grant.

At block 1004, the base station receives an indication of whether a user equipment (UE) is transmitting on the first TB, the second TB, or TBs for the uplink transmission occasion. For example, the base station (e.g., using the antenna 234, MOD/DEMOD 232, MIMO detector 236, receive processor 238, controller/processor 240, memory 242, and/or the like) may receive the indication. The indication may be implicit and based on a dedicated demodulation reference signal (DMRS) sequence. The indication may within uplink control information (UCI). In still other aspects, the indication is within a payload of a most recent physical uplink shared channel (PUSCH) transmitted before the uplink transmission occasion.

At block 1006, the base station receives the first TB, the second TB, or the TBs based on the indication. For example, the base station (e.g., using the antenna 234, MOD/DEMOD 232, MIMO detector 236, receive processor 238, controller/processor 240, memory 242, and/or the like) may receive the first TB, the second TB, or both TBs based on the indication.

Example Aspects

Aspect 1: A method of wireless communication by a user equipment (UE), comprising: receiving a configured grant for an uplink transmission occasion including a plurality of transport blocks (TBs), the configured grant indicating a first modulation and coding scheme (MCS) and a first quantity of layers for a first TB of the plurality of TBs, and a second MCS and a second quantity of layers for a second TB of the plurality of TBs; selecting at least one of the first TB or the second TB, from the plurality of TBs, for an uplink transmission based on an amount of data stored in an uplink buffer; and transmitting the data in the at least one the first TB or the second TB that was selected.

Aspect 2: The method of Aspect 1, further comprising: selecting the first TB associated with the first MCS when the uplink buffer contains enough data to transmit on the first TB associated with the first MCS, but not enough data to transmit on the plurality of TBs, the first MCS being higher than the second MCS; selecting the second TB associated with the second MCS when the uplink buffer contains enough data to transmit on the second TB associated with the second MCS but too much data to transmit on the first TB with the first MCS; and skipping transmission during the transmission occasion when the uplink buffer does not contain enough data to transmit on the second TB with the second MCS.

Aspect 3: The method of Aspect 1 or 2, further comprising receiving a configuration indicating a TB to select when the uplink buffer does not contain enough data to transmit on the plurality of TBs.

Aspect 4: The method of any of the preceding Aspects, further comprising repeating transmission on layers of the second TB of the plurality of TBs in response to selecting the first TB of the plurality of TBs for uplink transmission, the first TB and the second TB having a same quantity of layers.

Aspect 5: The method of any of the preceding Aspects, further comprising repeating transmission of the data a plurality of times on layers of the second TB of the plurality of TBs in response to selecting the first TB of the plurality of TBs for uplink transmission, the first TB having a smaller quantity of layers than the second TB.

Aspect 6: The method of any of the preceding Aspects, further comprising transmitting information related to the data transmitted on the first TB of the plurality of TBs selected for the uplink transmission, the information being transmitted on layers of the second TB of the plurality of TBs, the first TB having a larger quantity of layers than the second TB.

Aspect 7: The method of any of the preceding Aspects, in which the information related to the data comprises additional parity bits for the data.

Aspect 8: The method of any of the preceding Aspects, in which the information related to the data comprises selected layers for the data.

Aspect 9: The method of any of the preceding Aspects, further comprising remapping layers for transmitting data on the first TB to include layers of the second TB of the plurality of TBs in response to the first TB having a larger quantity of layers than the second TB.

Aspect 10: The method of any of the preceding Aspects, further comprising indicating to a network whether the UE is transmitting on the first TB or the plurality of TBs.

Aspect 11: The method of any of the preceding Aspects, in which the indicating is implicit based on a dedicated demodulation reference signal (DMRS) sequence.

Aspect 12: The method of any of the Aspects 1-10, in which the indicating is via uplink control information (UCI).

Aspect 13: The method of any of the Aspects 1-10, in which the indicating is via a payload of a most recent physical uplink shared channel (PUSCH) transmitted before the uplink transmission occasion.

Aspect 14: A method of wireless communication by a network entity, comprising: transmitting a configured grant for an uplink transmission occasion including a plurality of transport blocks (TBs), the configured grant indicating a first modulation and coding scheme (MCS) and a first quantity of layers for a first TB of the plurality of TBs, and a second MCS and a second quantity of layers for a second TB of the plurality of TBs; receiving an indication of whether a user equipment (UE) is transmitting on the first TB, the second TB, or the plurality of TBs for the uplink transmission occasion; and receiving the first TB, the second TB, or the plurality of TBs based on the indication.

Aspect 15: The method of Aspect 14, in which the indication is implicit and based on a dedicated demodulation reference signal (DMRS) sequence.

Aspect 16: The method of Aspect 14, in which the indication is within uplink control information (UCI).

Aspect 17: The method of Aspect 14, in which the indication is within a payload of a most recent physical uplink shared channel (PUSCH) transmitted before the uplink transmission occasion.

Aspect 18: An apparatus for wireless communication by a user equipment (UE), comprising: a memory; and at least one processor coupled to the memory, the at least one processor configured: to receive a configured grant for an uplink transmission occasion including a plurality of transport blocks (TBs), the configured grant indicating a first modulation and coding scheme (MCS) and a first quantity of layers for a first TB of the plurality of TBs, and a second MCS and a second quantity of layers for a second TB of the plurality of TBs; to select at least one of the first TB or the second TB, from the plurality of TBs, for an uplink transmission based on an amount of data stored in an uplink buffer; and to transmit the data in the at least one the first TB or the second TB that was selected.

Aspect 19: The apparatus of Aspect 18, in which the at least one processor is further configured: to select the first TB associated with the first MCS when the uplink buffer contains enough data to transmit on the first TB associated with the first MCS, but not enough data to transmit on the plurality of TBs, the first MCS being higher than the second MCS; to select the second TB associated with the second MCS when the uplink buffer contains enough data to transmit on the second TB associated with the second MCS but too much data to transmit on the first TB with the first MCS; and to skip transmission during the transmission occasion when the uplink buffer does not contain enough data to transmit on the second TB with the second MCS.

Aspect 20: The apparatus of Aspect 18 or 19, in which the at least one processor is further configured to indicate a TB to select when the uplink buffer does not contain enough data to transmit on the plurality of TBs.

Aspect 21: The apparatus of any of the Aspects 18-20, in which the at least one processor is further configured to repeat transmission on layers of the second TB of the plurality of TBs in response to selecting the first TB of the plurality of TBs for uplink transmission, the first TB and the second TB having a same quantity of layers.

Aspect 22: The apparatus of any of the Aspects 18-21, in which the at least one processor is further configured to repeat transmission of the data a plurality of times on layers of the second TB of the plurality of TBs in response to selecting the first TB of the plurality of TBs for uplink transmission, the first TB having a smaller quantity of layers than the second TB.

Aspect 23: The apparatus of any of the Aspects 18-22, in which the at least one processor is further configured to transmit information related to the data transmitted on the first TB of the plurality of TBs selected for the uplink transmission, the information being transmitted on layers of the second TB of the plurality of TBs, the first TB having a larger quantity of layers than the second TB.

Aspect 24: The apparatus of any of the Aspects 18-23, in which the information related to the data comprises additional parity bits for the data.

Aspect 25: The apparatus of any of the Aspects 18-24, in which the information related to the data comprises selected layers for the data.

Aspect 26: The apparatus of any of the Aspects 18-25, in which the at least one processor is further configured to transmit data on the first TB to include layers of the second TB of the plurality of TBs in response to the first TB having a larger quantity of layers than the second TB.

Aspect 27: The apparatus of any of the Aspects 18-26, in which the at least one processor is further configured to indicate to a network whether the UE is transmitting on the first TB or the plurality of TBs.

Aspect 28: The apparatus of any of the Aspects 18-27, in which the processor indicates implicitly based on a dedicated demodulation reference signal (DMRS) sequence.

Aspect 29: The apparatus of any of the Aspects 18-27, in which the processor indicates via uplink control information (UCI).

Aspect 30: The apparatus of any of the Aspects 18-27, in which the processor indicates to the network via a payload of a most recent physical uplink shared channel (PUSCH) transmitted before the uplink transmission occasion.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

What is claimed is:

1. A method of wireless communication by a user equipment (UE), comprising:
    receiving a configured grant for an uplink transmission occasion including a plurality of transport blocks (TBs), the configured grant indicating a first modulation and coding scheme (MCS) and a first quantity of layers for a first TB of the plurality of TBs, and a second MCS and a second quantity of layers for a second TB of the plurality of TBs;
    selecting at least one of the first TB or the second TB, from the plurality of TBs, for an uplink transmission based on an amount of data stored in an uplink buffer;
    selecting the first TB associated with the first MCS when the amount of data in the uplink buffer exceeds a first threshold indicating enough data to transmit on the first TB associated with the first MCS, but is less than a second threshold indicating not enough data to transmit on the plurality of TBs, the first MCS being higher than the second MCS;
    selecting the second TB associated with the second MCS when the amount of data in the uplink buffer exceeds a third threshold indicating enough data to transmit on the second TB associated with the second MCS but is less than a fourth threshold indicating not enough data to transmit on the first TB with the first MCS;
    transmitting the data in the at least one the first TB or the second TB that was selected; and
    skipping transmission during the transmission occasion when the uplink buffer does not contain enough data to transmit on the second TB with the second MCS.

2. The method of claim 1, further comprising receiving a configuration indicating a TB to select when the uplink buffer does not contain enough data to transmit on the plurality of TBs.

3. The method of claim 1, further comprising repeating transmission on layers of the second TB of the plurality of TBs in response to selecting the first TB of the plurality of TBs for uplink transmission, the first TB and the second TB having a same quantity of layers.

4. The method of claim 1, further comprising repeating transmission of the data a plurality of times on layers of the second TB of the plurality of TBs in response to selecting the first TB of the plurality of TBs for uplink transmission, the first TB having a smaller quantity of layers than the second TB.

5. The method of claim 1, further comprising transmitting information related to the data transmitted on the first TB of the plurality of TBs selected for the uplink transmission, the information being transmitted on layers of the second TB of the plurality of TBs, the first TB having a larger quantity of layers than the second TB.

6. The method of claim 5, in which the information related to the data comprises additional parity bits for the data.

7. The method of claim 5, in which the information related to the data comprises selected layers for the data.

8. The method of claim 1, further comprising remapping layers for transmitting data on the first TB to include layers of the second TB of the plurality of TBs in response to the first TB having a larger quantity of layers than the second TB.

9. The method of claim 1, further comprising indicating to a network whether the UE is transmitting on the first TB or the plurality of TBs.

10. The method of claim 9, in which the indicating is implicit based on a dedicated demodulation reference signal (DMRS) sequence.

11. The method of claim 9, in which the indicating is via uplink control information (UCI).

12. The method of claim 9, in which the indicating is via a payload of a most recent physical uplink shared channel (PUSCH) transmitted before the uplink transmission occasion.

13. An apparatus for wireless communication by a user equipment (UE), comprising:
    a memory; and
    at least one processor coupled to the memory, the at least one processor configured:
        to receive a configured grant for an uplink transmission occasion including a plurality of transport blocks (TBs), the configured grant indicating a first modulation and coding scheme (MCS) and a first quantity of layers for a first TB of the plurality of TBs, and a second MCS and a second quantity of layers for a second TB of the plurality of TBs;
        to select at least one of the first TB or the second TB, from the plurality of TBs, for an uplink transmission based on an amount of data stored in an uplink buffer;
        to select the first TB associated with the first MCS when the amount of data in the uplink buffer exceeds a first threshold indicating enough data to transmit on the first TB associated with the first MCS, but is less than a second threshold indicating not enough data to transmit on the plurality of TBs, the first MCS being higher than the second MCS;
        to select the second TB associated with the second MCS when the amount of data in the uplink buffer exceeds a third threshold indicating enough data to transmit on the second TB associated with the second MCS but is less than a fourth threshold indicating not enough data to transmit on the first TB with the first MCS;
        to transmit the data in the at least one the first TB or the second TB that was selected; and
        to skip transmission during the transmission occasion when the uplink buffer does not contain enough data to transmit on the second TB with the second MCS.

14. The apparatus of claim 13, in which the at least one processor is further configured to indicate a TB to select when the uplink buffer does not contain enough data to transmit on the plurality of TBs.

15. The apparatus of claim 13, in which the at least one processor is further configured to repeat transmission on layers of the second TB of the plurality of TBs in response to selecting the first TB of the plurality of TBs for uplink transmission, the first TB and the second TB having a same quantity of layers.

16. The apparatus of claim 13, in which the at least one processor is further configured to repeat transmission of the data a plurality of times on layers of the second TB of the plurality of TBs in response to selecting the first TB of the plurality of TBs for uplink transmission, the first TB having a smaller quantity of layers than the second TB.

17. The apparatus of claim 13, in which the at least one processor is further configured to transmit information related to the data transmitted on the first TB of the plurality of TBs selected for the uplink transmission, the information being transmitted on layers of the second TB of the plurality of TBs, the first TB having a larger quantity of layers than the second TB.

18. The apparatus of claim 17, in which the information related to the data comprises additional parity bits for the data.

19. The apparatus of claim 17, in which the information related to the data comprises selected layers for the data.

20. The apparatus of claim 13, in which the at least one processor is further configured to transmit data on the first TB to include layers of the second TB of the plurality of TBs in response to the first TB having a larger quantity of layers than the second TB.

21. The apparatus of claim 13, in which the at least one processor is further configured to indicate to a network whether the UE is transmitting on the first TB or the plurality of TBs.

22. The apparatus of claim 21, in which the at least one processor indicates implicitly based on a dedicated demodulation reference signal (DMRS) sequence.

23. The apparatus of claim 21, in which the at least one processor indicates via uplink control information (UCI).

24. The apparatus of claim 21, in which the at least one processor indicates to the network via a payload of a most recent physical uplink shared channel (PUSCH) transmitted before the uplink transmission occasion.

* * * * *